J. STINE.
MECHANICAL MOVEMENT.
APPLICATION FILED OCT. 24, 1914.
1,160,009.
Patented Nov. 9, 1915.
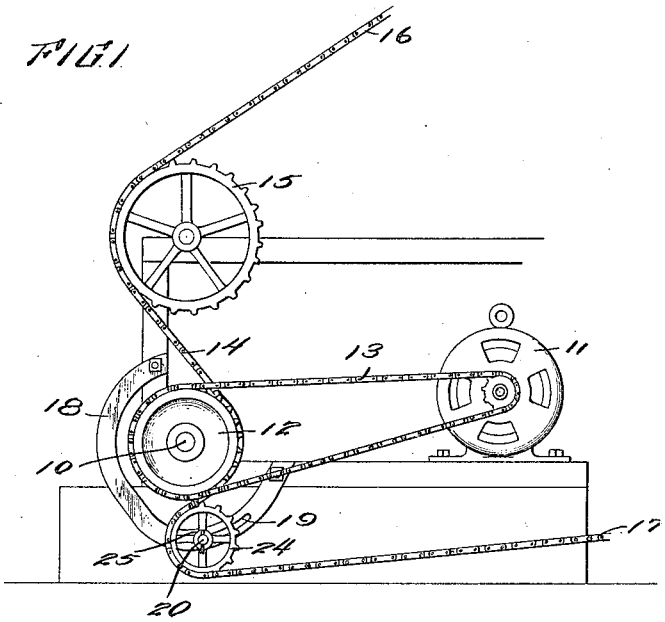
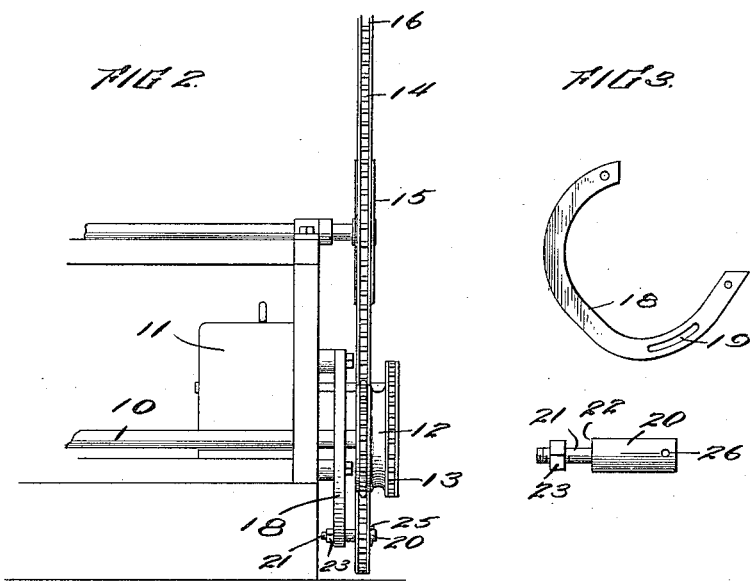
Witnesses
Inventor
John Stine,
By
Attorneys

UNITED STATES PATENT OFFICE.

JOHN STINE, OF BEAUMONT, TEXAS.

MECHANICAL MOVEMENT.

1,160,009.   Specification of Letters Patent.   Patented Nov. 9, 1915.

Application filed October 24, 1914. Serial No. 868,484.

*To all whom it may concern:*

Be it known that I, JOHN STINE, a citizen of the United States, residing at Beaumont, in the county of Jefferson and State of Texas, have invented certain new and useful Improvements in Mechanical Movements; and I do hereby declare the following to be a full, clear, and exact description of the invention, such as will enable others skilled in the art to which it appertains to make and use the same.

This invention relates to mechanical movements and has for an object to provide a chain and sprocket movement with improved means for maintaining the chain in operatively taut condition and relation to the sprocket wheel.

A further object of the invention is to provide a mechanical movement having a sprocket wheel and chain engaging along one side thereof and with an idler movable concentrically with the sprocket and adapted to maintain the chain in engagement with such sprocket.

With these and other objects in view the invention comprises certain novel constructions, combinations and arrangement of parts, as will be hereinafter more fully described and claimed.

In the drawings: Figure 1 is a view of the improved mechanical movement in side elevation showing a conventional drive. Fig. 2 is a view of the mechanical movement in edge elevation as indicated by arrow 2 at Fig. 1. Fig. 3 is a detail elevation of the rigid arm carrying the movable idler sprocket. Fig. 4 is a view in elevation of the idler journal.

Like characters of reference designate corresponding parts throughout the several views.

The improved mechanical movement which forms the subject-matter of this application comprises a shaft 10 driven in any approved manner as the motor 11, the style or type of motor forming no part of the present invention, it being only necessary to drive the shaft 10. Upon the shaft 10 a double sprocket wheel 12 is mounted over one side of which runs the drive chain 13. Over the other side of the sprocket 12 the chain 14 operates which passes over a sprocket 15, the chain then passing on to do other work as indicated by being broken at 16 and 17. Adjacent the shaft 10 and double sprocket 12 a curved brace arm 18 is secured having a slot 19 concentric with the shaft 10. In this slot 19 a journal 20 is mounted to operate adjustably in any usual and approved manner as by forming a reduced shank 21 defining a shoulder 22, which bears against the brace arm 18 and is provided with a nut 23 for clamping the said shoulder 22 rigidly against the brace arm 18. Upon this journal bearing 20 an idler sprocket 24 is journaled and is maintained in position in any usual and ordinary manner, as by the use of the cotter pin 25 inserted through the opening 26 of such bearing. The sprocket 24 is of less radius than the distance between the slot 19 and the periphery of the double sprocket 12, so that the teeth of the two sprockets do not engage but afford sufficient interval for the chain 14 to pass therebetween.

It will be apparent, especially from an examination of Fig. 1, that by moving the bearing stud 20 in the slot 19 the axis of the idler 24 follows an arc concentric with the shaft 10 so that the sprocket chain 14 at all times engages the greatest possible number of sprocket teeth upon the sprocket 12. The idler 24 running adjacent the periphery of the sprocket 12 also serves to hold the chain in intimate engagement with the teeth of such sprocket 12.

In operation it is obvious that the tightening or loosening of the chain 14 as might be required in operation would be accomplished by moving the axis of the idler 24 along the slot 19 in an obvious manner.

I claim:

In a mechanical movement, a plurality of chains, mounting means therefor including a plurality of sprocket wheels, a rotary device constituting a portion of the mounting means for each chain, the sprocket wheels and rotary device being located in substantially the same plane, one of said chains engaging an arc of the rotary device and the other chain engaging the complementary arc thereof, and adjusting means for one of the chains comprising an idler and an arc-shaped member carrying said idler, the adjusting means varying the position of the chain last-mentioned with reference to the rotary device, and varying the tension of said chain.

In testimony whereof I affix my signature in presence of two witnesses.

JOHN STINE.

Witnesses:
CHAS. D. SMITH,
MORRIS M. MOTHNER.

Copies of this patent may be obtained for five cents each, by addressing the "Commissioner of Patents, Washington, D. C."